United States Patent Office 3,338,662
Patented Aug. 29, 1967

3,338,662
PRODUCTION OF FIBROUS CELLULOSE ETHERS USING IODIDE SALTS AS CATALYSTS
Ricardo H. Wade, Metairie, and Clark M. Welch and Howard P. Bennett, New Orleans, La., assignors to the United States of America as represented by the Secretary of Agriculture
No Drawing. Filed Oct. 15, 1965, Ser. No. 496,728
11 Claims. (Cl. 8—120)

This is a continuation-in-part of Ser. No. 341,141, filed Jan. 29, 1964.

A non-exclusive, irrevocable, royalty-free license in the invention herein described, throughout the world for all purposes of the United States Government, with the power to grant sublicenses for such purposes, is hereby granted to the Government of the United States of America.

This invention relates to the production of fibrous cellulose crosslinked ethers using organic and inorganic iodide salts to accelerate the etherification reaction.

The primary object of this invention is to provide an improved process for the production of highly substituted, thermoplastic, rot-resistant cellulose fibers, yarns and fabrics and also crosslinked ethers of cellulose in fiber, yarn and fabric form that exhibit enhanced resiliency and dimensional stability. For textile purposes, it is highly advantageous to preserve the fiber structure and high molecular weight of cellulose as it occurs in cotton, wood pulp, ramie, flax, jute and hemp, and in fibrous regenerated cellulose such as spun rayon, to all of which the present processes are applicable. The processes described here are found to produce a high degree of substitution within short periods of reaction, thus minimizing degradative side reactions which in slow etherification processes cause tendering, embrittlement, and stiffening of yarns and fabrics, and which in some cases produce solution of the fibers in the reaction medium, destroying the textile qualities of the cellulose.

Advantages of the catalytic processes described herein lie not only in the high rate of etherification obtained, which often exceeds the rate of noncatalyzed etherification by 40–500%, but also in the fact that the noncatalyzed etherification may come to a halt after less than two hydroxyl groups in every three anhydroglucose units of cellulose have been etherified [Klein, Stanonis, Harbrink, and Berni, Textile Research J., 28 659 (1958), Table IV] whereas higher degrees of substitution are often reached in the catalyzed processes of this invention.

The most general and widely used method of cellulose etherification is by the treatment of cellulose with sodium hydroxide to give a chemically activated material, soda cellulose, which in turn can be heated with an organic halide to form the cellulose ether. Organic chlorides generally are preferred to the corresponding bromides or iodides because of the low cost and ready availability of the former, but in many cases the chlorides react too slowly with cellulose to be practical. The use of iodide salts overcomes this difficulty by accelerating the etherification of cellulose by organic chlorides. The processes of this invention may be represented as follows:

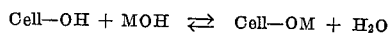

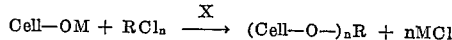

Here Cell—OH is a portion of a cellulose chain, M is an alkali metal atom, X is a catalyst chosen from the class consisting of alkali metal iodides and aliphatic quaternary ammonium iodides, and RCl$_n$ is an organic monochloride or an organic polychloride having in each molecule at least one functional group of the structure

where R' and R" may be the same or different organic radicals or segments of the same ring and are chosen from the class consisting of hydrogen, alkyl, cycloalkyl, aralkyl, aryl, alkenyl, cycloalkenyl, and alkynyl radicals.

Where an unsaturated organic chloride is used, the carbon-to-carbon multiple linkage serves as a locus for the graft polymerization of monomers such as styrene onto the cellulose ether, by means of heat, irradiation, oxygen, or peroxides, to increase the abrasion resistance and water repellency of the cellulose. Moreover heat and oxygen are known to cause crosslinking of such unsaturated ethers of cellulose, imparting increased dimensional stability and resistance to chemical attack. Crosslinking occurs directly where an organic chloride contains at least two reactive chlorine atoms per molecule.

Although other iodide salts soluble in alkali metal hydroxides may be employed as the catalyst in this process, the alkali metal iodides are preferred because of their exceptional freedom from precipitation reactions, their lack of color, and their low cost.

The procedure employed in the present process is simple and capable of many variations applicable to different forms of cellulose and types of organic chlorides. The cellulosic fiber, yarn or fabric is treated with an aqueous solution containing from about 8% to 33% of the alkali metal hydroxide and from about 5% to 25% of the alkali metal iodide or aliphatic quaternary ammonium iodide catalyst. After the cellulose has soaked in this aqueous solution for a period of one to sixty minutes at ordinary temperature, it may be drained of excess solution and is then heated with the organic chloride alone or in the presence of an inert water-immiscible diluent at a temperature in the range of 80°–180° C., preferably at 80°–130° C. when the pressure is one atmosphere, to avoid excessive losses of volatile reactants and diluents, and for a period of time which depends on the degree of cellulose substitution desired, but which ordinarily ranges from 15 minutes to six hours. After the reaction has been completed, the etherified cellulosic fibers, yarns, or fabrics may be freed of excess organic halide, alkali and salts by washing with water and water-miscible organic solvents. For organic dihalides of low molecular weight, washing with alcohol and water usually suffices. For organic dihalides which tend to form polymers through side reactions with hot alkalis, steeping of the treated yarn in hot triethanolamine is preferred as a means of polymer removal, followed by washing in alcohol and water. Further extraction with a polymer solvent may be carried out.

It has been found preferable that the organic chloride remain in a separate phase from the aqueous alkali during the etherification of cellulose and that the organic chloride not be solubilized in the aqueous alkali, as such solubilization results in hydrolysis of the organic chloride by the alkali and this interferes with the desired etherification of cellulose. Therefore, water-miscible organic diluents for the alkali or the organic chloride are to be avoided. The effectiveness of the iodide catalysts is especially novel and unique in that these ionic catalysts remain in the aqueous phase which is distinct and separate from the liquid organic phase containing the organic chloride and is also separate from the solid cellulosic phase. Such catalysis in a three-phase heterogeneous system is unusual.

One phase of our invention provides a process for etherifying fibrous cellulosic material comprising these steps:

(a) Wetting the said fibrous cellulosic material with an aqueous alkali metal hydroxide solution about from 8% to 33% by weight, selected from the group consisting of sodium hydroxide and potassium hydroxide mixed with an alkali metal iodide about from 5% to 25% by weight, selected from the group consisting of potassium iodide and sodium iodide, and (b) Reacting the wet cellulosic material to a degree of substitution of about from 0.05 to 1.0 with an organic chloride selected from the group consisting of 2,3-dichloro-1-propene, 1,4-dichloro-2-butyne, and hexachlorocyclopentadiene.

Another phase of our invention provides polymeric materials as products of the process of our invention, wherein (a) Fibrous cellulose is substituted to the extent about from 0.05 to 0.45 crosslinking group per anhydroglucose unit, said crosslinking group having the structure

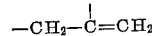

the cellulosic ether having retained the fibrous structure and textile properties common to the original native cellulose, (b) Fibrous cellulose is substituted to the extent about from 0.05 to 0.35 crosslinking group per anhydroglucose unit, said crosslinking group having the structure $-CH_2-C\equiv C-CH_2-$, the cellulosic ether having retained the fibrous structure and textile properties common to the original native cellulose, and (c) Fibrous cellulose is substituted to the extent about from 0.05 to 0.15 crosslinking group per anhydroglucose unit, said crosslinking group having the structure

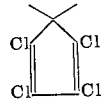

the cellulosic ether having retained the fibrous structure and textile properties common to the original native cellulose.

The following examples are chosen to illustrate the instant continuation-in-part and are not meant to limit the scope of the invention, other procedures and catalysts that can be employed within the scope of this invention. All percentages are meant to express a weight-to-weight relationship.

*Example 1*

A skein of 12/3 kiered yarn, weighing 2.0 grams, was immersed, slack, in an aqueous solution containing 23% sodium hydroxide and 20% sodium iodide. After 30 minutes the skein was removed and centrifuged to a wet pickup of 255%. The sample was then placed in a large test tube fitted with an air condenser, and was covered with 60 ml. of 2,3-dichloro-1-propene. The reaction tube was then placed in a thermostatically controlled heating bath at 100° C. of 30 minutes. The reaction tube was removed from the bath, the skein withdrawn from the compound and soaked in three portions of alcohol for 10 minutes each portion, centrifuging for one minute after the last two soakings to remove all the reactants and byproducts.

The derivative had a weight gain of 10.5% over the untreated cotton corresponding to a degree of substitution of 0.45 calculated on the basis of a propylene crosslink. Fibers of the treated yarn were insoluble in 0.5 M cupriethylenediamine hydroxide solution, indicating the cotton cellulose had been crosslinked. A chlorine analysis of the derivative indicated a chlorine content of only 0.3%. The yarn had a breaking strength of 7.6 pounds.

In a comparative reaction wherein the sodium iodide was omitted, the weight gain of the finished product was 4.8% and a breaking strength of 7.1 pounds, and only a trace of chlorine was detected on analysis. The iodide salt used in the process of this invention accelerated the etherification by 119%.

*Example 2*

A skein of 12/3 kiered yarn weighing 4.0 grams was immersed, slack, in an aqueous solution containing 23% sodium hydroxide and 20% sodium iodide. After 30 minutes the skein was removed and centrifuged to a wet pickup of 260%. The sample was then placed in a test tube fitted with an air condenser and covered with a mixture consisting of 1 part 1,4-dichloro-2-butyne and 1 part Tetralin, an inert solvent. The reaction tube was then placed in a thermostatically controlled heating bath at 115° C. for 30 minutes. The yarn was removed and soaked in two portions of alcohol for 10 minutes each portion. The yarn was centrifuged after the second soading, then was extracted with dimethyl sulfoxide for 20 minutes at 115° C. The yarn was then washed again in alcohol as above described and finally in running tap water for 30 minutes. It was centrifuged and dried overnight at room conditions. The derivative had a weight gain of 12.5% and was insoluble in 0.5 M cupriethylenediamine hydroxide solution. The insolubility of the product was indicative of crosslinks. The weight gain corresponds to 0.39 crosslinking groups per anhydroglucose unit.

In a comparative reaction wherein the sodium iodide was omitted the weight gain of the finished product was 10.5%.

*Example 3*

A skein of 12/3 kiered cotton yarn, weighing 4.2 grams, was immersed, slack, in an aqueous solution containing 23% sodium hydroxide and 20% sodium iodide. After 30 minutes the skein was removed and centrifuged to a wet pickup of 245%. The sample was then placed in a glass stoppered tube and covered with 60 ml. of hexachlorocyclopentadiene and gently shaken mechanically for 24 hours at room temperature. The sample was removed and washed 3 times in alcohol with centrifuging after each of the last 2 washes. The sample was then washed in running tap water for 30 minutes, centrifuged and dried overnight at room conditions. The derivative had a weight gain of 16.6% over the untreated cotton corresponding to insertion of 0.13 crosslinking groups per anhydroglucose unit. The final weight gain was not changed by extracting with dimethyl formamide, a polymer solvent, for one hour at steam bath temperature.

The treated yarn was insoluble in 0.5 M cupriethylenediamine hydroxide solution, this insolubility being indicative of crosslinks.

In a comparative reaction wherein the sodium iodide was omitted the weight gain of the finished product was 10.4%.

We claim:

1. A process for etherifying fibrous cellulosic material comprising:
    (a) wetting the said fibrous cellulosic material with an aqueous alkali metal hydroxide solution about from 8% to 33% by weight, selected from the group consisting of sodium hydroxide and potassium hydroxide mixed with an alkali metal iodide about from 5% to 25% by weight, selected from the group consisting of potassium iodide and sodium iodide, and
    (b) reacting the wet cellulosic material to a degree of substitution of about from 0.05 to 1.0 with an organic chloride selected from the group consisting of 2,3-dichloro-1-propene, 1,4-dichloro-2-butyne, and hexachlorocyclopentadiene.

2. The process of claim 1 wherein the alkali metal hydroxide is sodium hydroxide.

3. The process of claim 1 wherein the alkali metal hydroxide is potassium hydroxide.

4. The process of claim 1 wherein the alkali metal iodide is potassium iodide.

5. The process of claim 1 wherein the alkali metal iodide is sodium iodide.

6. The process of claim 1 wherein the organic chloride is 2,3-dichloro-1-propene.

7. The process of claim 1 wherein the organic chloride is 1,4-dichloro-2-butyne.

8. The process of claim 1 wherein the organic chloride is hexachlorocyclopentadiene.

9. As a polymeric material, the fibrous cellulose ether substituted with a crosslinking group to the extent of about from 0.05 to 0.45 crosslinking group per anyhdroglucose unit, said crosslinking group having the structure

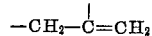

the cellulosic ether having retained the fibrous structure and textile properties common to the original native cellulose.

10. As a polymeric material, the fibrous cellulose ether substituted with a crosslinking group to the extent of about from 0.05 to 0.35 crosslinking group per anhydroglucose unit, said crosslinking group having the structure $-CH_2-C\equiv C-CH_2-$, the cellulosic ether having retained the fibrous structure and textile properties common to the original native cellulose.

11. As a polymeric material, the fibrous cellulose ether substituted with a crosslinking group to the extent of about from 0.05 to 0.15 crosslinking group per anhydroglucose unit, said crosslinking group having the structure

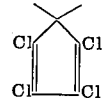

the cellulosic ether having retained the fibrous structure and textile properties common to the original native cellulose.

No references cited.

NORMAN G. TORCHIN, *Primary Examiner.*

J. CANNON, *Assistant Examiner.*